United States Patent [19]

Banco et al.

[11] Patent Number: 5,074,951

[45] Date of Patent: Dec. 24, 1991

[54] APPARATUS FOR INERT ATMOSPHERE SEALING

[75] Inventors: Michael J. Banco; R. Douglas Behr, both of Midland; Herbert B. Geiger, Bay City, all of Mich.

[73] Assignee: The Dow Chemical Company, Midland, Mich.

[21] Appl. No.: 248,079

[22] Filed: Sep. 23, 1988

[51] Int. Cl.⁵ .............................................. B32B 31/18
[52] U.S. Cl. ..................................... 156/515; 156/251; 83/169; 83/171; 83/651.1; 493/194; 493/199
[58] Field of Search ....................... 83/169, 171, 651.1; 493/190, 191, 194, 199; 156/515, 244.23, 251

[56] References Cited

U.S. PATENT DOCUMENTS

| | | | |
|---|---|---|---|
| 3,077,428 | 2/1963 | Heuser et al. | 156/244.23 X |
| 3,299,756 | 1/1967 | Rosenthal | 83/98 |
| 3,338,122 | 8/1967 | Lampe | 83/5 |
| 3,683,736 | 8/1972 | Loose | 83/171 X |
| 3,754,489 | 8/1973 | Carver, Jr. et al. | 83/171 |
| 3,978,749 | 9/1976 | Polenz | 83/169 |
| 4,018,117 | 4/1977 | Patterson | 83/171 |
| 4,316,763 | 2/1982 | Jensen | 156/515 X |
| 4,370,187 | 1/1983 | Katagiri et al. | 156/244.27 X |
| 4,396,449 | 8/1983 | Tumminia | 156/515 X |
| 4,464,219 | 8/1984 | Colombo et al. | 156/251 |

Primary Examiner—Frank T. Yost
Assistant Examiner—Rinaldi Rada

[57] ABSTRACT

Apparatus for severing a plurality of plies of a thermoplastic material and sealing the severed margins thereof is provided. The apparatus comprises a hot-wire element proximate the thermoplastic material for severing and sealing the thermoplastic material. The apparatus further comprises a chamber or manifold for enveloping the hot-wire element in an inert atmosphere which impinges on a proximal portion of the thermoplastic material to be severed and sealed. The apparatus further comprises an actuating mechanism, associated with the hot-wire element, for translating the hot-wire element toward the proximal portion of the thermoplastic material. As a result, the hot-wire element severs the plurality of plies and seals the severed margins thereof so that the severed margins are enveloped by the inert atmosphere impinging on the thermoplastic material.

13 Claims, 7 Drawing Sheets

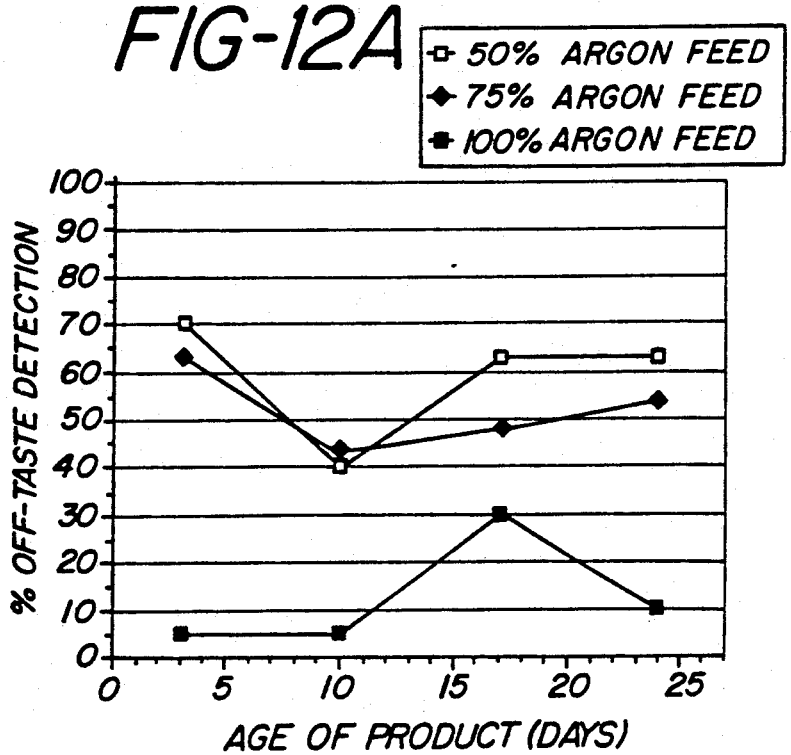
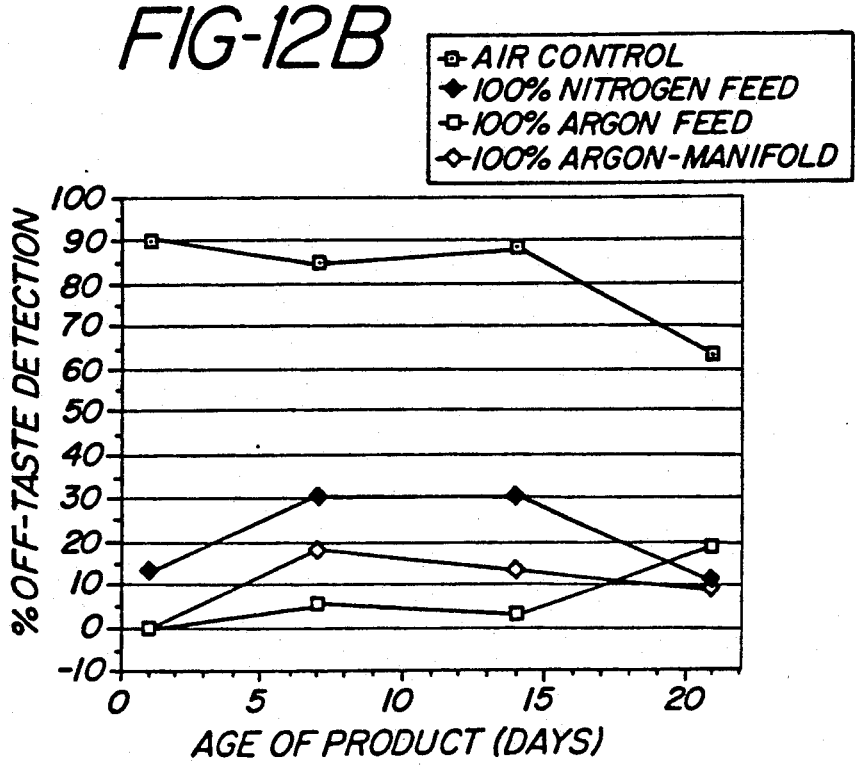

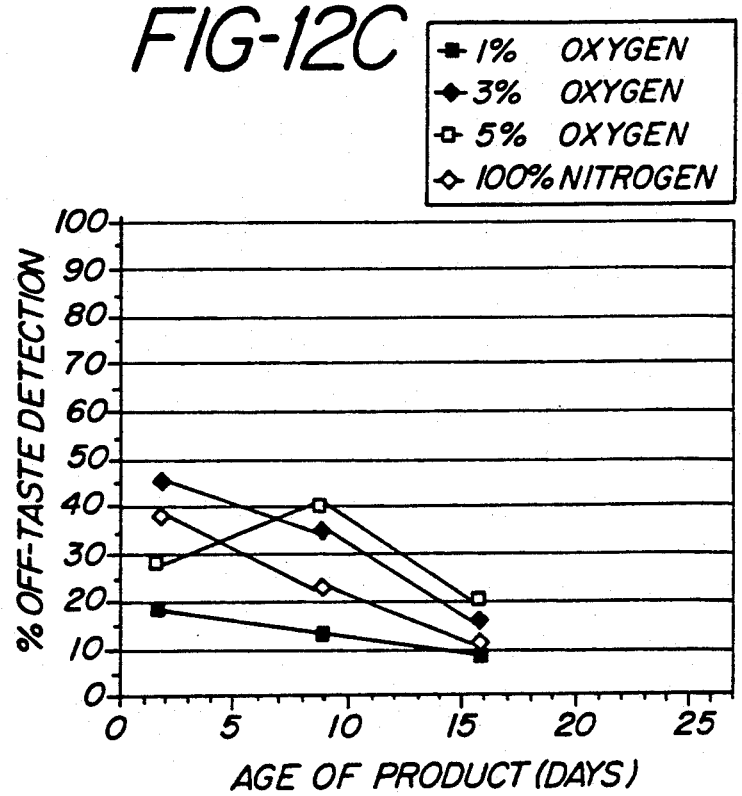
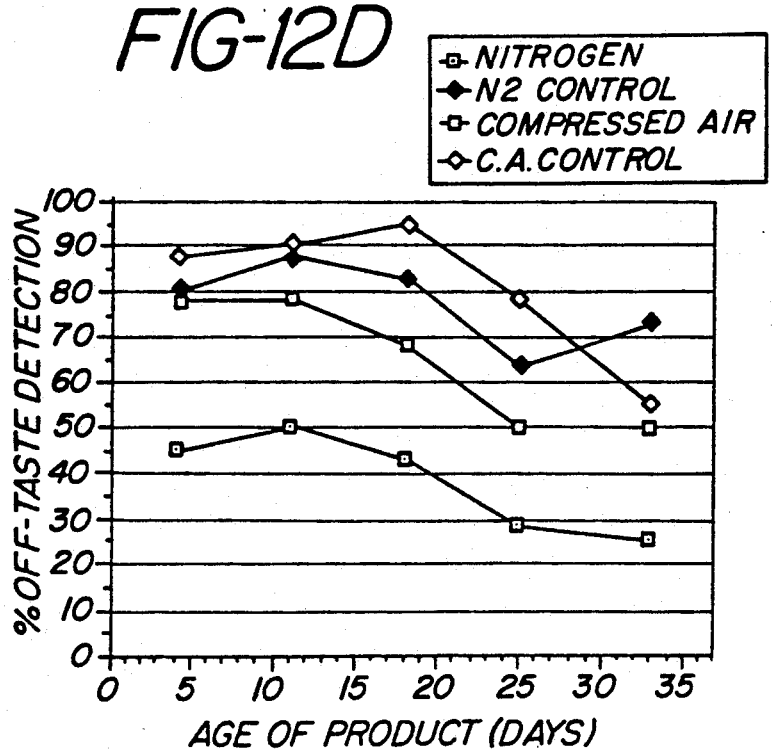

APPARATUS FOR INERT ATMOSPHERE SEALING

BACKGROUND OF THE INVENTION

This invention relates to severing and sealing thermoplastic material and, more particularly, to apparatus for using a hot wire to sever a plurality of plies of the thermoplastic material and sealing the severed margins thereof to form bags or similar containers.

In the process of manufacturing thermoplastic bags or other containers, a continuous web of the thermoplastic material is supplied from which individual bags are severed. The severed margins are sealed simultaneously to form the side seams of the bag. Typically, a hot-wire is used to sever and seal the thermoplastic material. The wire is formed of a metal alloy and may have a generally circular, elliptical, or rectangular cross-section and is usually heated to a temperature above about 1000° F. to sever and seal the thermoplastic material, such as a polyethylene resin.

A significant problem with using a hot-wire element is that the heat from the wire causes gaseous polymer degradation products such as aldehydes to form during the severing and sealing operation. Some of these gaseous degradation products become entrapped on the surface or in the bags which are formed. The presence of such gaseous degradation products can produce an unpleasant odor and impart an off-taste to foods later stored in the bag. Past approaches to the problem have focused on accelerating the dissipation of the degradation products from the bag after the bag has been formed, rather than on reducing their creation during bag formation. For example, fans have been used to ventilate the bags while moving along the assembly line after formation and while being packaged into cases. Inventory hold-times have been established to allow time for the degradation products to dissipate from the bags while being stored. Additionally, the bags sometimes are stored in curing rooms heated to above 115° F. to reduce the inventory holding-times.

Nevertheless, odor and taste problems associated with severing and sealing with a hot wire can be a serious problem. Accordingly, there is a need for apparatus that alleviates the odor and taste problems associated with using a hot wire to sever and seal thermoplastic material.

SUMMARY OF THE INVENTION

The present invention meets this need by providing apparatus for severing a plurality of plies of thermoplastic material and sealing the severed margins thereof in a substantially inert or reduced oxygen atmosphere which dramatically reduces the production of gaseous degradation products which cause odors in the bags that are made and cause off-tastes to foods stored therein. The lack of oxygen in the atmosphere proximate the thermoplastic material during severing and sealing greatly reduces the formation of odor-producing oxidation degradation products such as aldehydes which are believed to be principally responsible for the taste and odor problems associated with bags formed using hot-wire sever and seal elements.

In accordance with the present invention, apparatus is provided for severing a plurality of plies of a thermoplastic material and sealing the severed margins thereof. The apparatus comprises a hot-wire element proximate the thermoplastic material for severing and sealing the thermoplastic material by the application of heat. The apparatus further comprises means for enveloping the hot-wire element in an inert atmosphere which impinges on a proximal portion of the thermoplastic material to be severed and sealed. The apparatus further comprises actuating means, associated with the hot-wire element, for translating the hot-wire element toward the proximal portion of the thermoplastic material. As a result, the heat from the hot-wire element severs the plurality of plies and seals the severed margins thereof so that the severed margins are enveloped by the inert atmosphere impinging on the thermoplastic material. Preferably, less than 5% of the inert atmosphere is oxygen and at least 95% of the atmosphere is an inert gas, such as nitrogen, argon, or carbon dioxide. The term "inert gas", as used in the context of this invention, means a gas which does not react with the thermoplastic material of the bag, or any of the degradation products produced during the severing and sealing operation.

In a first embodiment of the apparatus, the means for enveloping the hot-wire element in an inert atmosphere includes a chamber enclosing the hot-wire element. The chamber has an opening through which the hot-wire element is translated and an inlet for receiving a supply of a substantially inert gas for flooding the chamber. In operation, the inert gas flows through the opening to impinge on the proximal portion of the thermoplastic material and envelope the hot-wire element.

In a second embodiment of the apparatus, the means for enveloping the hot-wire element in an inert atmosphere includes a manifold proximate the hot-wire element. The manifold has an elongate outlet aligned longitudinally with the hot-wire element and an inlet for receiving a supply of a substantially inert gas. The gas is directed by the elongate outlet toward the hot-wire element to form the inert atmosphere which envelopes the hot-wire element and then impinges on the proximal portion of the thermoplastic material.

Accordingly, it is an object of the present invention to provide apparatus for severing and sealing thermoplastic material in an inert atmosphere which alleviates the odor and taste problems associated with using a hot-wire to sever and seal thermoplastic material. This, and other objects and advantages of the present invention, will become apparent from the following detailed description, the accompanying drawings, and the appended claims.

DETAILED DESCRIPTION OF THE PREFERRED EMBODIMENTS

Figure 1:
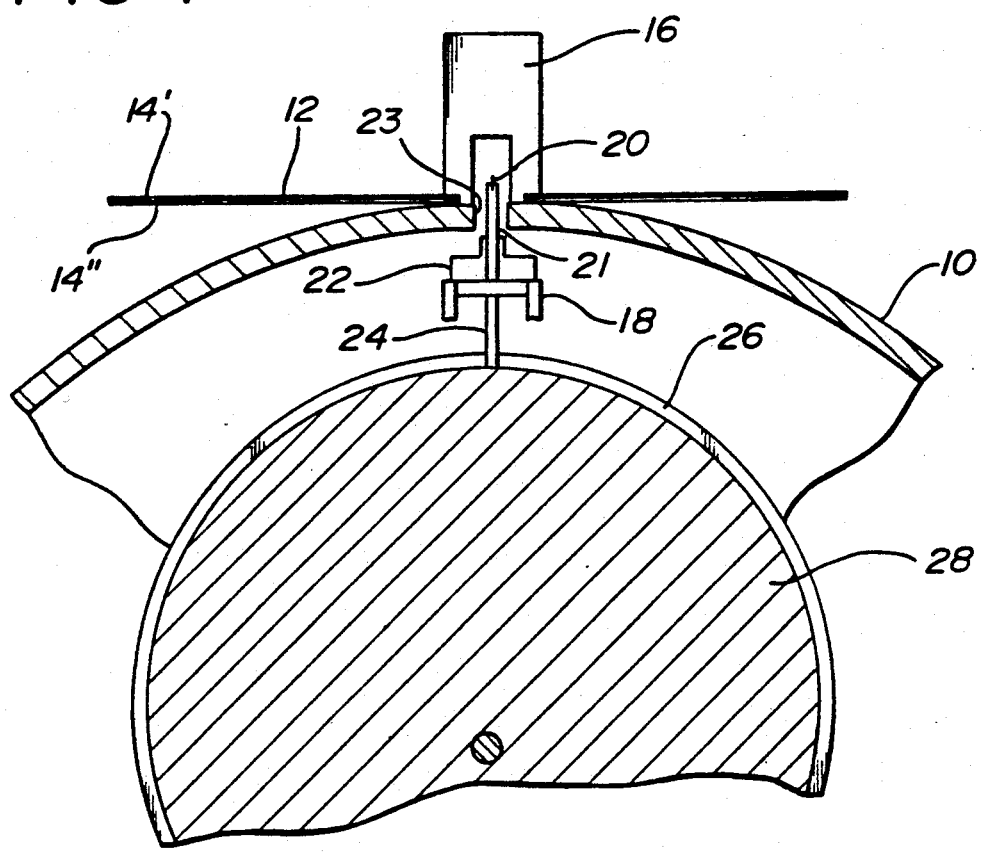
FIG. 1 is a schematic end view of a typical cutting and sealing apparatus which incorporates the apparatus of the present invention and illustrates the second embodiment of the invention.

FIG. 1 shows a device which is useful for making plastic bags or containers in accordance with the present invention. A drum 10, receives a supply of thermoplastic film or material 12. The thermoplastic material 12 comprises plies 14' and 14" of folded-over continuous web stock, which after severing and sealing, from the opposing faces of individual bags. While a film having folded-over plies is shown, it will be apparent to those skilled in the art that the present invention may be practiced using multiple films or a film having multilayer plies. The thermoplastic material 12 can be, for example, materials such as olefinic polymers or copolymers, polyesters, nylon, vinylidene chloride or vinyl chloride polymers and copolymers, and hydrolyzed ethylene vinyl alcohol resin. In the preferred embodiment, the thermoplastic material 12 is polyethylene.

A clamp 16 is moved into position to secure the material 12 to the drum 10 directly over a movable mechanism 18 which carries a cutting and sealing element or wire 20. The material 12 is clamped immediately adjacent a proximal portion 12' (See FIG. 5A) of the material 12 along which the material 12 is to be severed and sealed. After cutting, the clamp 16 is released. The wire 20 is seated in a notch in a post 21 connected to the movable mechanism 18. A plurality of such clamp and mechanism combinations may be located about the periphery of the drum 10 if desired. As shown, the wire 20 is at least as long as a thermoplastic material 12 to be severed, and preferably extends somewhat beyond either edge of the material 12.

Figure 6:
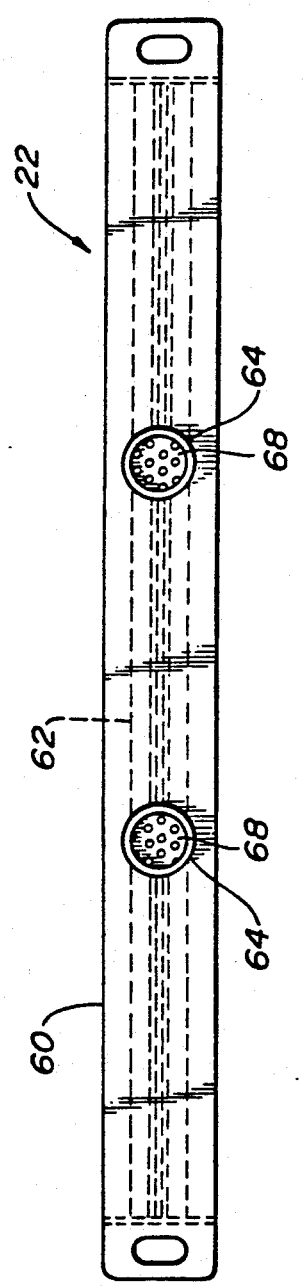
FIGS. 6, 7 and 8 are the bottom view, side view and end view, respectively, of the manifold shown in FIG. 4.
Figure 7:
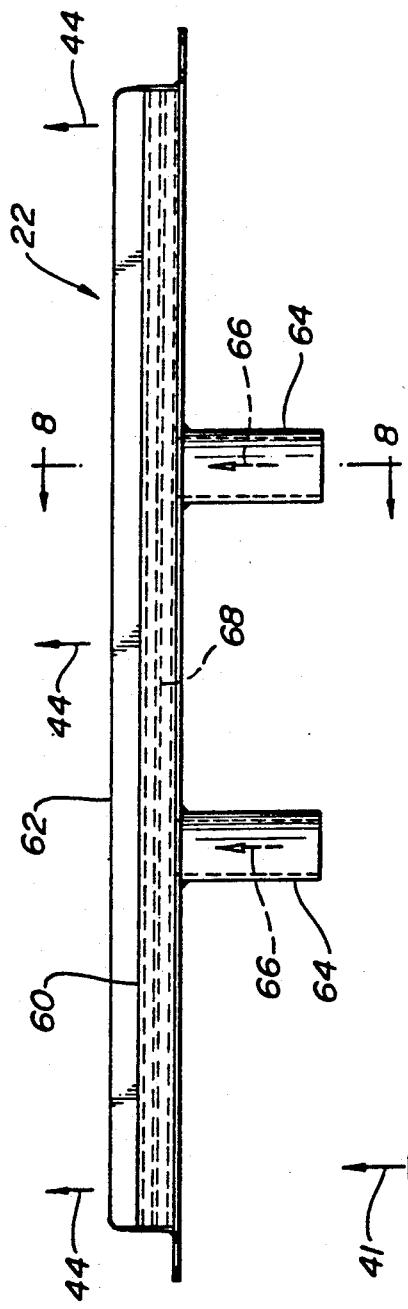
Figure 8:
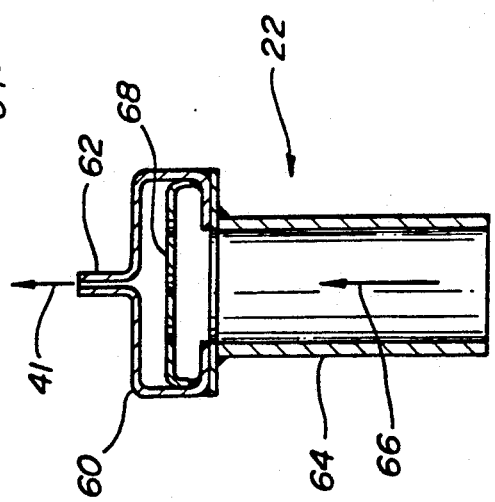

A manifold 22, which is shown in greater detail in FIGS. 6-8, is secured on the mechanism 18 below the wire 20 and has an elongate outlet (not shown) aligned longitudinally with and parallel to the wire 20 for providing an inert atmosphere that envelopes the wire 20. There is no relative motion between the manifold 22 and the wire 20 as mechanism 18 is translated. The manifold 22 and the operation thereof will be described in more detail herein below. Mechanism 18 translates radially inwardly and outwardly within drum 10 beneath cavity or slit 23 in the drum. Connector 24, which rides along a groove 26 formed about the peripheral edge of an eccentric cam 28, causes mechanism 18 to translate as drum 10 is rotated. As illustrated in FIG. 1, mechanism 18 is in its outermost position. After being severed and sealed by wire 20, thermoplastic material 12 is thereafter cooled on drum 10 and taken off as bags. The bags are then collected and boxed.

Figure 2:
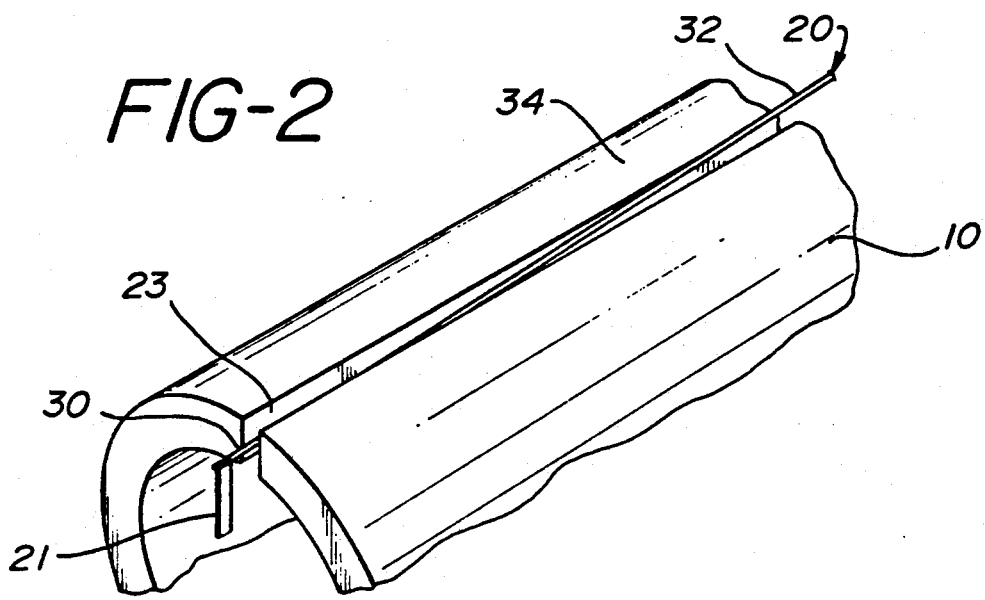
FIG. 2 is an isometric view from the end of the apparatus of FIG. 1.
Figure 3:
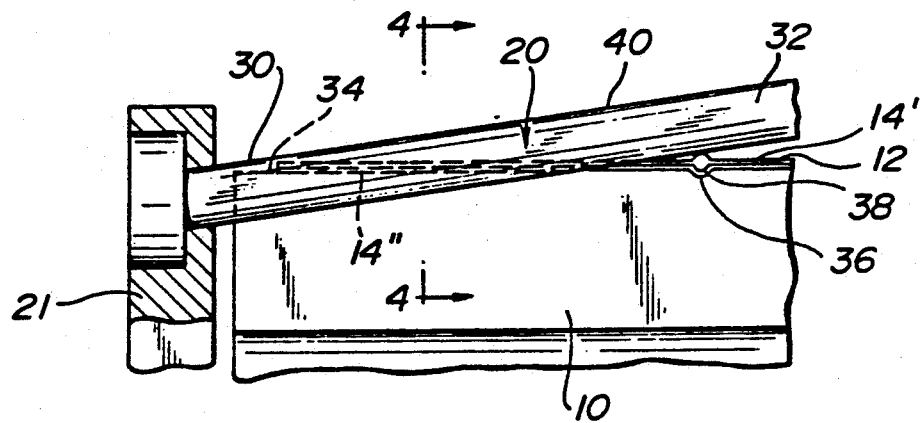
FIG. 3 is a greatly enlarged side view illustrating the mechanism in the apparatus of FIG. 1 for translating the wire toward the thermoplastic material.

The details of operation of wire 20 within cavity 23 of drum 10 are best shown in FIGS. 2 and 3. As can be seen, wire 20 is carried adjacent the ends of drum 10 and is supported by post 21 so that one end 30 is supported lower in cavity 23 than another portion 32 which rises above surface 34 of drum 10. This is accomplished by making support post 21 a different length than a corresponding post (not shown) at the opposite end of mechanism 18. Wire 20 is heated through support post 21 by conventional means (not shown) wherein the temperature is varied by adjusting the current flow therethrough.

Referring more specifically to FIG. 3, drum surface 34 contains a groove 36 for carrying a thickened thermoplastic section or protrusion 38, such as a zipper closure profile for engaging opposing plies 14' and 14" of the thermoplastic material 12. Such a closure, for example, is taught in U.S. Pat. No. Re. 28,969. Wire 20 is shown in a position after having passed through both plies 14' and 14" of thermoplastic material 12, simultaneously severing and sealing their edges or margins. The rise of wire 20 across the drum 10 is higher in portion 32 than it is at the opposite end 30 in the manner illustrated.

In actual practice, edge 40 which forms the top edge of wire 20 is illustrated at about the uppermost preferred limit for travel. This limit is reached when end 30 has just slightly passed through thermoplastic material 12. The fact that wire 20 may be put under strain and held down somewhat as it passes through thickened profile portion 38 is the reason that the suspension of element 20 is preferably higher at that end of mechanism 18.

Also, in a high speed process, if wire 20 rises too far after it passes through thermoplastic material 12, there may be a tendency as the thermoplastic material 12 relaxes to be frictionally engaged by wire 20 and pulled and degraded by the heat from wire 20. This can be avoided by stopping wire 20 at a desired height after it has passed through thermoplastic film plies 14' and 14". For example, in the preferred embodiment, the rise of edge 40 may be about 50-60 mils above drum surface 34 at end position 32 and only about 20-25 mils at opposite end position 30.

Wire 20 is preferably fabricated of a high temperature metal alloy such as Inconel 625 (trademark), Inconel X750 (trademark), Chromel C (trademark) or Chromel A (trademark). Other known high temperature metal alloys may also be utilized. It has been found that such alloys may be heated to temperatures above about 1050° F. The alloy may be formed as a rod and then drawn into a wire. The wire may have a circular, elliptical, or rectangular cross-section, or may have any of the several cross-sections disclosed by Tumminia, U.S. Pat. No. 4,396,449. Preferably, the element is drawn to a relatively small elliptical cross-section. However, the wire itself forms no part of the present invention and may be any suitable alloy which can withstand the high temperatures of operation of the apparatus.

Figure 4:
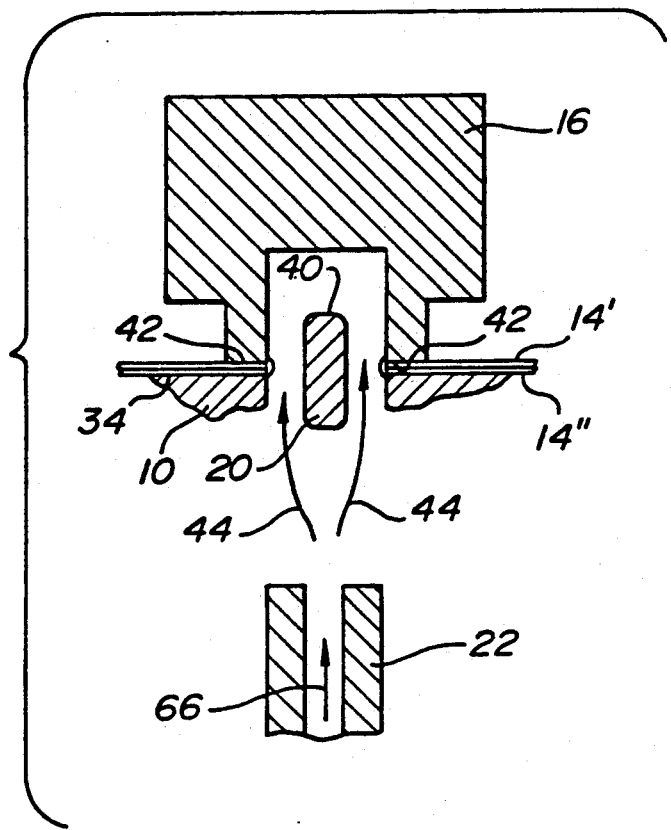
FIG. 4 is a cross-sectional view taken along the reference line 4—4 of FIG. 3, adding the clamp and a portion of the manifold of FIG. 1, the manifold being a second embodiment of the apparatus of the present invention.

FIG. 4 shows a detailed schematic taken along the line 4—4 of FIG. 3, adding only clamp 16 and the nozzle portion of manifold 22, which is a portion of the second embodiment of the present invention. The nozzle of manifold 22 is located below the wire, and preferably approximately 0.6 cm below the bottom of wire 20. Wire 20 is shown after it has been translated through film plies 14' and 14" which have been clamped by jaws 42 of clamp 16 on each side thereof, wire 20 being in the position shown in FIG. 3. Manifold 22 directs an inert gas, indicated by arrows 44, toward wire 20 so that the inert gas envelops wire 20. Preferably, inert gas is supplied to the manifold at 20-55 cubic feet per hour. FIGS. 5A-5D show the sequence in which the wire 20 is translated toward and through the proximal portion 12' of film 12 to sever plies 14' and 14".

Figure 5A:
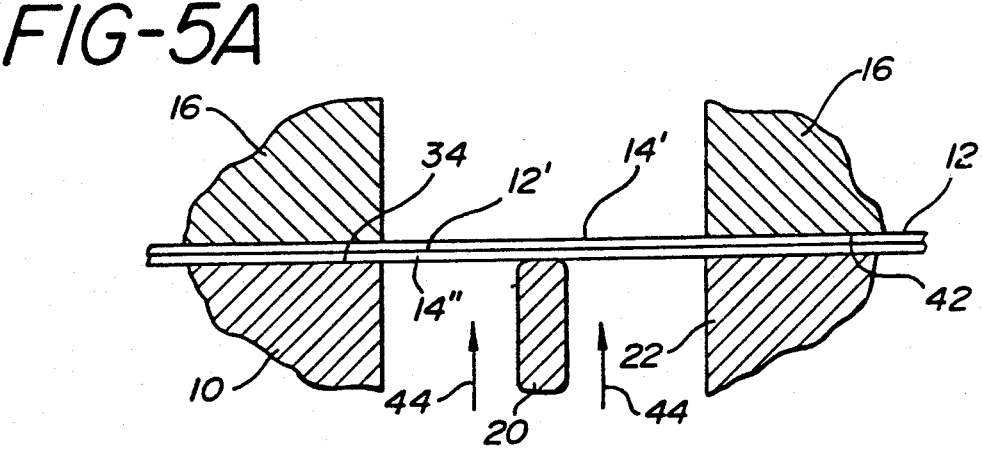
FIGS. 5A, 5B, 5C and 5D are enlarged views of FIG. 4, excluding the manifold, which illustrate the sequence of events as the wire is translated toward and through the plies of thermoplastic material.
Figure 5B:
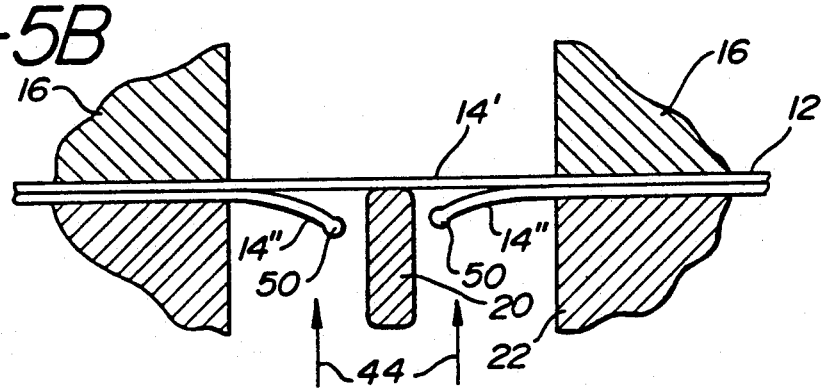
Figure 5C:
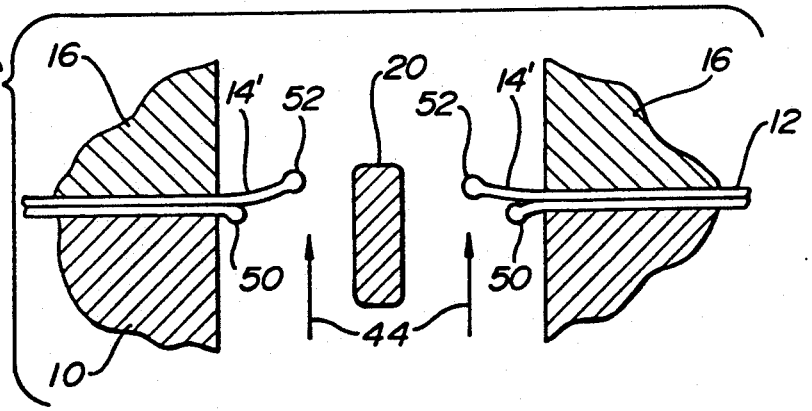
Figure 5D:
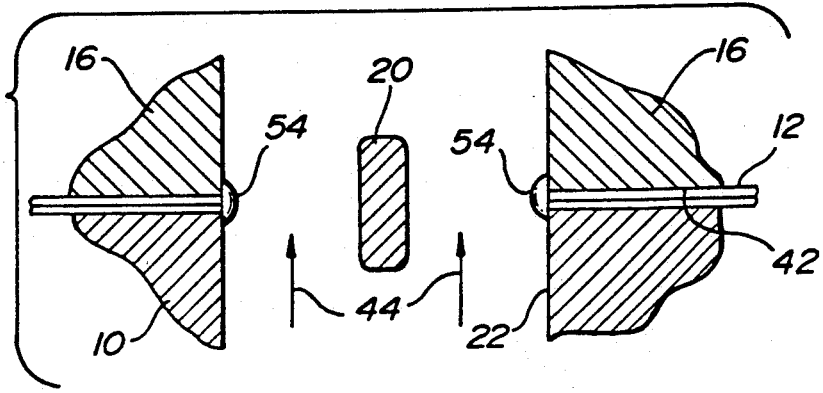

FIG. 5A shows wire 20 translated against proximal portion 12' of the film 12. While the drawings show wire 20 in physical contact with film 12, it will be appreciated that in many instances the heat from wire 20 will cause film 12 to melt and sever without ever physically contacting it. The inert gas 44 envelops wire 20 and impinges on proximal portion 12' to be severed and sealed. Wire 20 then severs first ply 14" and melts severed margins 50 thereof in the presence of inert gas 44 which impinges on second ply 14' as shown in FIG. 5B. The severed margins 50 shrink away from wire 20 so that there is essentially no contact between the two before wire 20 severs second ply 14' of film 12. Wire 20 then severs second ply 14' and melts severed margins 52 thereof in presence of the inert gas 44 as shown in FIG. 5C. The severed margins 52 of first ply 14" shrink back to clamping jaws 42 which hold film plies 14' and 14" together after they are severed. Finally, wire 20 reaches the stop position above surface 34 of drum 10 as shown in FIG. 5D and seals severed margins 50 and 52 of plies 14" and 14' of film 12 to form bead seals 54 in the presence of the inert gas 44. The bead seals 54 form the side edges of the bag.

FIGS. 6-8 show the bottom view, side view and end view, respectively, of manifold 22 which comprises a rectangular-shaped tube 60 closed at both ends, an elongated outlet or nozzle 62 opening from one side of tube 60 along its longitudinal axis and aligned longitudinally with wire 20 as described above, and tubes 64 secured to openings in the other side of rectangular tube 60. The manifold and inlet and outlet tubes may be fabricated from any suitable material. Steel is preferred because of the relatively high temperatures which are encountered during operation. Tubes 64 serve as inlets to manifold 22 for receiving inert gas under pressure as indicated by arrows 66. A baffle 68, fabricated from perforated stainless steel, is soldered within rectangular tube 60 between nozzle 62 and inlets 64 to distribute inert gas 66 more evenly along the length of nozzle 62. In a preferred embodiment, the outlet of nozzle 62 is approximately 12 inches long and 0.76 mm wide.

Inert gas 66 is fed to manifold 22 at flow rates ranging between 20 and 55 cubic feet per hour. As inert gas 44 exits nozzle 62 of manifold 22, it forms an inert atmosphere which nozzle 62 directs toward wire 20. Although the flow of the inert gas 44 over wire 20 has a cooling effect, the temperature of wire 20 is maintained by increasing the current flow thereto. The inert atmosphere envelops wire 20 and impinges on the proximal portion 12' of film 12 as described above. As wire 20 moves vertically toward film 12, manifold 22 moves along with it so that there is no relative motion between manifold 22 and wire 20.

Figure 9:
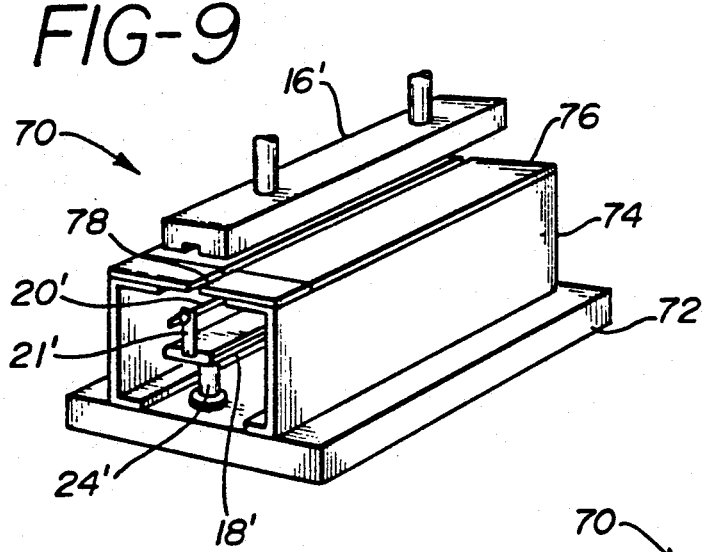
FIG. 9 is a perspective view of a portion of the first embodiment of the present invention in a manually-operated apparatus for sealing.

A portion of the first embodiment of the present invention in a manually operated sealing device is shown generally at 70 in FIG. 9. This sealing device 70 is a manually-operated version of the severing and sealing device shown in FIGS. 1 to 5, and operates substantially in the same manner. Sealing device 70 comprises a base plate 72 and an open-ended channel tube 74 fastened and sealed to base plate 72 forming an annular chamber through which inert gas is passed. Channel tube 74 has a surface 76 on which thermoplastic film 12 (not shown) is positioned to be severed and sealed in the same manner as when positioned on surface 34 of drum 10. Film 12 covers an opening 78 in surface 76 of channel tube 74 through which wire 20' is translated and is secured on surface 76 by clamp 16'. Wire 20' is seated in a notch (not shown) in post 21' which is supported on movable mechanism 18'. Mechanism 18' slides upwardly and downwardly under opening 78 in response to connector 24' which is cam driven.

Figure 10:
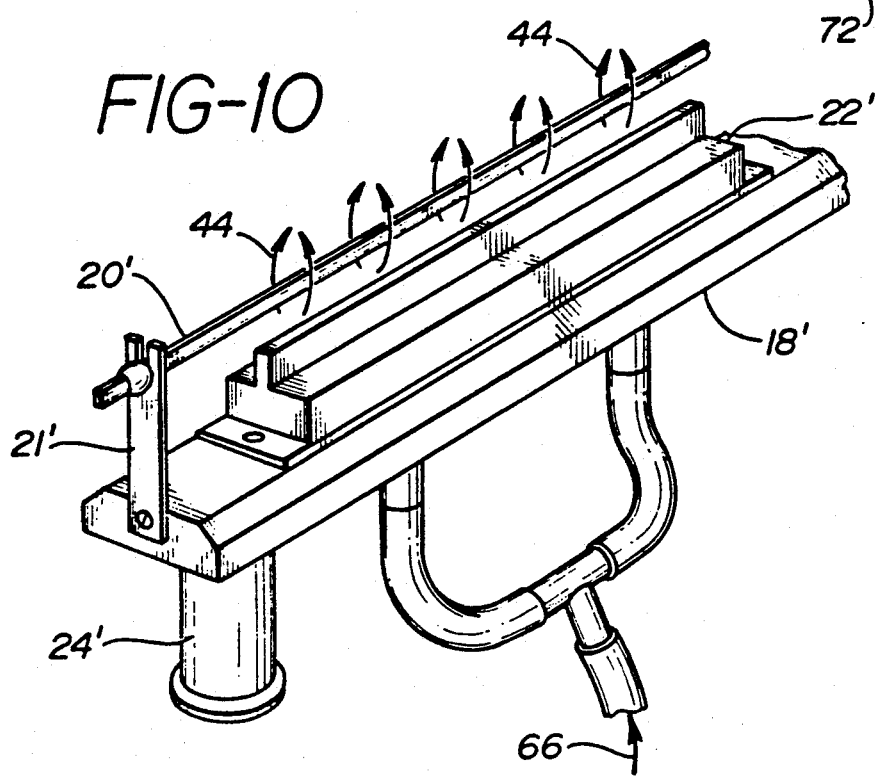
FIG. 10 is a perspective view of a variation of the embodiment of the apparatus shown in FIG. 9.

FIG. 10 illustrates a variation of the embodiment shown in FIG. 9. That device comprises a sealing device (not shown) and manifold 22' installed on the surface of mechanism 18' and below wire 20' as shown in FIG. 10 and as described hereinabove. This embodiment operates by feeding inert gas 66 to manifold 22' which directs inert gas, shown by arrows 44, toward wire 20'. Thus, wire 20 is enveloped in an inert atmosphere which impinges on proximal portion 12' of film 12 (as shown in FIG. 5A) to be severed and sealed as shown in FIGS. 5A-5D.

Figure 11:
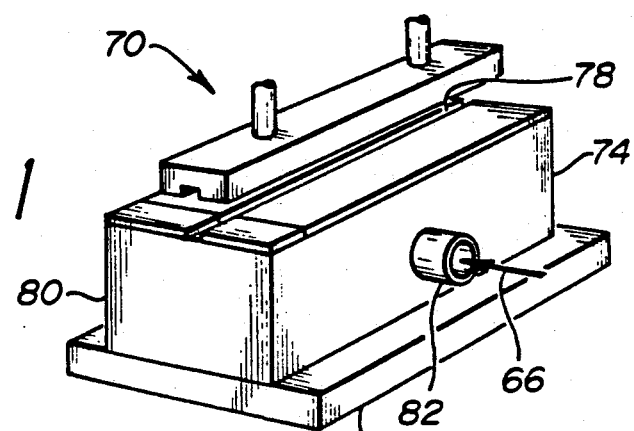
FIG. 11 is a perspective view of another variation the first embodiment of the apparatus according to the present invention; and, FIGS. 12A, 12B, 12C and 12D are graphical representations of the effect of severing and sealing the thermoplastic material in an inert atmosphere on taste.

Another variation of the first embodiment of the present invention comprises sealing device 70 and end plates 80 (one not shown) which close open ends of channel tube 74 as shown in FIG. 11. Channel tube 74 is provided with an inlet 82 for receiving inert gas 66. Base plate 72, channel tube 74 and end plates 80 form a chamber which is flooded by inert gas 66 to envelop wire 20 in an inert atmosphere, which flows through opening 78 and impinges on proximal potion 12' of thermoplastic material 12 (as shown in FIG. 5A) to be severed and sealed as shown in FIGS. 5A-5D. Preferably, the inert gas 66 is provided to the chamber at a pressure of 20-40 psi.

The inert atmosphere which envelops the wire 20, 20' contains at least about 95% inert gas and less than about 5% oxygen. The inert gas can be for example, nitrogen, argon or carbon dioxide, i.e., a gas which does not react with the thermoplastic material 12 to produce gaseous polymer oxidation products, such as aldehydes, during the severing and sealing operation. In an ambient air atmosphere, without a substantially inert atmosphere or reduced oxygen atmosphere, polymer degradation and oxidation can occur when hot-wire 20, 20' passes through thermoplastic material 12. Any compounds which are produced can result in off-flavors or odors in the bags. In many instances, visible smoke is generated. Also, some of the off-flavor producing compounds may find their way onto the surface and into the interior of the bags, which can cause perceptible odor problems as well as imparting off-flavors to foods stored within.

We have found that the severing and sealing operation conducted in a substantially inert or reduced oxygen atmosphere significantly reduces the evolution of smoke with a concomitant reduction in odors and off-flavors in foods stored within the bags. While not wishing to be bound by any specific theory, we believe that the presence of the inert atmosphere during the severing and sealing operation made possible by the use of two embodiments described hereinabove results in reduced thermo-oxidation products. Furthermore, the products that are formed have lower molecular weights and dissipate more rapidly.

In order that the invention may be readily understood, reference is made to the following examples, which are intended to illustrate the invention, but are not to be taken as limiting the scope thereof. All tests were run at wire temperatures of about 1050° F. Eighty one-quart storage bags made of polyethylene having plies 0.001 inch thick were produced as samples in different inert atmospheres.

The samples were boxed into four dispensers, with 20 bags to a dispenser. Taste tests were then administered to panelists as follows. Bags made in each inert atmosphere were tested by selecting four bags from each dispenser and placing approximately 15 grams of crushed potato chips in each bag. The bags were then zipped closed, individually wrapped in wax paper to keep bag odors in and room odors out, and stored at constant temperature of 72° F. for 24 hours. Potato chips were used as the test medium since the oil from the chips tends to absorb any odors within the bags.

After 24 hours, the chips from each bag were placed on paper plates and, along with two plates of controlled chips which were not stored in the bags, were arranged on a tray. One of the control samples was labeled as such while the other was used as a hidden control. Ten panelists were then asked to compare the flavor of each sample of chips with the control sample. For each sample, the panelists checked "yes" if they agreed that the test sample tasted the same as the controlled sample. If a panelist detected an off-taste, the panelist checked "no", and the degree of off-taste was indicated as either slight, medium, or strong.

The percentage of off-taste detection was then calculated by dividing the number of "no" responses, irrespective of the degree of off-taste, by the total number of responses. The results were then averaged for each inert atmosphere and are shown in FIGS. 12A-12D. The tests were repeated after the number of days indicated. Experiment 1 and the first three parts of Experiment 2 were conducted using the first embodiment of the apparatus as shown in FIG. 11. Experiment 3 and the fourth part of Experiment 2 were conducted using the version of the second embodiment as shown in FIG. 10. Experiment 4 was conducted using the second embodiment as shown in FIGS. 1-4.

EXPERIMENT 1

In the first part of this experiment, 100% argon was used as the inert gas to flood the chamber. The resulting inert atmosphere enveloping the hot-wire was subsequently analyzed to contain about 3.2% oxygen. In a second part of the experiment, a mixture of 75% argon and 25% air was used and in the third part of the experiment a 50/50 mix of argon and air was used. In all three parts of the experiment, these gases were delivered at a pressure of about 30 psi.

FIG. 12A is a graph of the percent off-taste detection versus the age of the product for bags sealed in the three different atmospheres. As shown in the graph, bags sealed with 100% argon feed, a 96.8% inert atmosphere, performed significantly better in taste tests than bags sealed with either the 50% or 75% argon feeds. In fact, taste tests over a four week period yielded an average off-taste detection of only 12% for bags sealed with the 100% argon feed in which less than 5% of the inert atmosphere was oxygen. An "acceptable" level of off-taste perception was arbitrarily defined as two consecutive weeks where no more than 50% of the panelists perceived an off-taste. The bags sealed with 100% argon feed had two consecutive weeks with no more than 50% off-taste detection.

EXPERIMENT 2

In the first part of this experiment, bags were sealed in stagnant air to act as a control by which to compare the effects of the severing and sealing operation in an inert atmosphere containing argon and nitrogen. In the second part of the experiment, bags were sealed under a nitrogen atmosphere that was established by flooding the chamber with 100% percent nitrogen gas delivered at a pressure of 40 psi and resulting in an inert atmosphere containing about 96.5% nitrogen with 3.5% oxygen. In the third part of this experiment, this procedure was repeated using 100% argon gas feed as the inert gas which created an inert atmosphere containing about 2.7% oxygen. In the fourth part of this experiment, manifold embodiment 22' of the instant invention was used to envelop hot-wire 20', wherein 100% argon gas feed was provided to the manifold at a flow rate of 55 cubic feet per hour.

FIG. 12B shows the percent off-taste perception for bags sealed in this experiment. The graph indicates an improvement over the control portion for bags sealed in the other three parts of the experiment. Bags sealed in the nitrogen atmosphere had a four week average off-taste detection of 21%. Bags sealed in the argon atmosphere of the chamber averaged a 6% off-taste detection. Thus, bags sealed in an inert atmosphere wherein at least 95% of the atmosphere was argon or nitrogen and wherein less than 5% was oxygen substantially exceeded the requirements for acceptability. Bags sealed in the argon atmosphere provided by manifold 22' also satisifed the arbitrary acceptability standard by averaging a 10% off-taste detection.

EXPERIMENT 3

In this experiment, nitrogen gas feed containing no oxygen, 1% oxygen, 3% oxygen and 5% oxygen was provided to manifold 22' at a flow rate of 40 cubic feet per hour for the four parts of the experiment. As can be seen in FIG. 12C, using manifold 22' to provide an inert atmosphere containing at least 95% nitrogen and less than 5% oxygen worked equally as well as the inert atmosphere containing argon described in Experiment 2.

In a separate but related experiment, bags were sealed using a gas mixture of 5% oxygen and nitrogen feed to manifold 22' at 20 cubic feet per hour which resulted in a three week average off-taste detection of 40%. Thus, inert gas flow rates as low as 20 cubic feet per hour were suitable for use with manifold 22'.

EXPERIMENT 4

In this experiment, manifold 22 was installed as indicated in FIGS. 1-5. The gases tested in this trial were nitrogen and compressed air which were provided to manifold 22 at a flow rate of about 50 cubic feet per hour. FIG. 12D shows the percent off-taste detection versus time for bags collected in this trial and indicates that bags sealed in the nitrogen-rich atmosphere performed significantly better than any of the other bags tested. These bags averaged 38% off-taste detection over five weeks, and were the only bags at or below the acceptable limit of 50% off-taste detection throughout the test.

Experiments were also run to quantify the presence of certain volatile aldehyde compounds which are believed to form as degradation products during the hot wire severing and sealing of polyethylene bags. Such aldehyde compounds are believed to contribute to the off-taste and flavors perceived by consumers of foods stored within such bags. The gases inside the bags were identified and quantified using liquid chromatography techniques. The gases in the bag were checked for the presence of five, six, and seven carbon aldehydes (i.e., pentanal, hexanal, and heptanal). Aldehyde formation was discovered to be about 20 times greater for bags sealed in quiescent air than for bags sealed in a reduced oxygen atmosphere. Such results indicate that severing and sealing thermoplastic material in an inert atmosphere substantially reduce the formation of such compounds.

As can be seen, a correlation is established between using a substantially inert atmosphere, taste and odor causing degradation compound concentration, and off-taste perception when using a substantially inert atmosphere containing no more than 5% oxygen in the severing and sealing operation. Such inert atmosphere sealing in a reduced oxygen atmosphere produces a lesser concentration of such compounds and fewer perceptions of off-taste. The test data indicates that inert gases, such as nitrogen and argon, in quantities of at least about 95% can be used in any of the three embodiments described above to envelop the hot wire in an inert atmosphere for minimizing the production of aldehyde degradation products and off-taste perceptions.

Having described the invention in detail and by reference to preferred embodiments thereof, it will be apparent that other modifications and variations are possible without departing from the scope of the invention defined in the appended claims.

What is claimed is:

1. Apparatus for severing a plurality of plies of a thermoplastic material and sealing the severed margins thereof comprising:
    a hot-wire element, proximate the thermoplastic material, for severing and sealing the thermoplastic material by the application of heat;
    means for enveloping said hot-wire element in an inert atmosphere which atmosphere impinges on a proximal portion of the thermoplastic material to be severed and sealed, said means for enveloping said hot-wire element in said inert atmosphere comprises a chamber enclosing said hot-wire element, said chamber having an opening through which said hot-wire element is translated, and an inlet for receiving substantially inert gas for flooding said chamber; and
    actuating means, associated with said hot-wire element, for translating said hot-wire element toward the proximal portion of the thermoplastic material to sever the plurality of plies and seal the severed margins thereof so that the severed margins are enveloped by said inert atmosphere impinging on the thermoplastic material.

2. Apparatus as recited in claim 1, wherein said inert gas is provided at a pressure between about 30 and 40 psi.

3. Apparatus as recited in claim 2, wherein the temperature of said hot-wire element is about 1050° F.

4. Apparatus for severing a plurality of plies of a thermoplastic material and sealing the severed margins thereof comprising:
    a wire proximate the thermoplastic material, said wire being heated and movable to sever and seal the thermoplastic material;
    a chamber enclosing said wire and having an opening through which said wire is translatable and an inlet for receiving substantially inert gas, said opening directing said substantially inert gas to impinge on a proximal portion of the thermoplastic material to be severed and sealed; and
    actuating means, coupled to said wire, for translating said wire toward the proximal portion of the thermoplastic material to sever the plurality of plies and seal the severed margins thereof, whereby the severed margins are enveloped by said inert gas impinging on the thermoplastic material.

5. Apparatus as recited in claim 4, wherein said inert gas is provided at a pressure between about 30 and 40 psi.

6. Apparatus as recited in claim 5, wherein the temperature of said wire is about 1050° F.

7. Apparatus as recited in claim 4, wherein less than about 5% of said inert gas is oxygen.

8. Apparatus as recited in claim 4, wherein at least about 95% of said inert gas is selected from the group consisting of nitrogen, argon, carbon dioxide and mixtures thereof.

9. Apparatus for severing a plurality of plies of a thermoplastic material and sealing the severed margins thereof comprising:
    a wire proximate the thermoplastic material, said wire being heated and movable to sever and seal the thermoplastic material;
    a manifold proximate said wire having an elongate outlet aligned longitudinally with said wire and an inlet for receiving substantially inert gas, said inert gas being directed by said elongate outlet toward said wire to envelop said wire in an inert atmosphere; and
    actuating means, associated with said wire, for translating said wire against the proximal portion of the themoplastic material to sever the plurality of plies and seal the severed margins thereof, whereby the severed margins are enveloped by said inert atmosphere impinging on the thermoplastic material.

10. The apparatus as recited in claim 9, wherein said inert gas is directed toward said wire at a rate of at least 20 cubic feet per hour.

11. Apparatus as recited in claim 10, wherein the temperature of said wire is about 1050° F.

12. Apparatus as recited in claim 9, wherein less than about 5% of said inert atmosphere is oxygen.

13. Apparatus as recited in claim 9, wherein at least about 95% of the inert gas is selected from the group consisting of nitrogen, argon, carbon dioxide, and mixtures thereof.

* * * * *